US010154440B2

(12) United States Patent
Cao (10) Patent No.: US 10,154,440 B2
(45) Date of Patent: Dec. 11, 2018

(54) SEAMLESS MOBILE HANDOVER

(71) Applicant: Parallel Wireless, Inc., Nashua, NH (US)

(72) Inventor: Yang Cao, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 14/942,950

(22) Filed: Nov. 16, 2015

(65) Prior Publication Data

US 2016/0142944 A1  May 19, 2016

Related U.S. Application Data

(60) Provisional application No. 62/080,255, filed on Nov. 14, 2014.

(51) Int. Cl.
*H04W 36/00* (2009.01)
*H04W 84/04* (2009.01)
*H04W 84/12* (2009.01)

(52) U.S. Cl.
CPC ...... *H04W 36/0022* (2013.01); *H04W 84/045* (2013.01); *H04W 84/12* (2013.01)

(58) Field of Classification Search
CPC  H04W 84/0005; H04W 84/047; H04W 36/08
See application file for complete search history.

(56) References Cited

U.S. PATENT DOCUMENTS 6,473,411 B1 * 10/2002 Kumaki ............... H04L 29/06
                                                        370/331
8,693,456 B2    4/2014 Liu
(Continued)

FOREIGN PATENT DOCUMENTS

EP   2816846 A1    12/2014
WO   2011137118 A1  11/2011
WO   2012044148 A1   4/2012

OTHER PUBLICATIONS

Tuomas Taipale, "Feasibility of Wireless Mesh for LTE-Advanced Small Cell Access Backhaul," Aalto University, School of Electrical Engineering, Sep. 14, 2012, retrieved from http://docplayer.net/ 6623658-Feasibility-of-wireless-mesh-for-lte-advanced-small-cell-access-backhaul.html.

(Continued)

*Primary Examiner* — Vladimir Magloire
*Assistant Examiner* — Ernest Tacsik
(74) *Attorney, Agent, or Firm* — Michael Y. Saji (57) ABSTRACT

A localized method for performing handover of a mobile device at a mobile base station is disclosed, comprising: establishing, at a cellular base station, a relay connection with a second base station for backhaul; receiving a handover request for a mobile device, the handover request including an IP address; receiving, at the cellular base station, a handover confirmation message from the mobile device following handover authorization for the mobile device; sending, from the cellular base station, a request to the mobile device to shut down a cellular radio connection with the cellular base station; and establishing, using the IP address and a non-cellular radio, a data connection with the mobile device on the same IP address, thereby performing a handover of the mobile device for providing continued IP connectivity for the mobile device at the cellular base station.

15 Claims, 8 Drawing Sheets

(56) References Cited

U.S. PATENT DOCUMENTS

| | | |
|---|---|---|
| 9,078,286 B1 | 7/2015 | Yuan et al. |
| 9,510,256 B2 | 11/2016 | Krishna et al. |
| 2006/0083186 A1 | 4/2006 | Handforth et al. |
| 2007/0030809 A1 | 2/2007 | Dayama |
| 2008/0002741 A1* | 1/2008 | Maheshwari .......... H04B 7/155 370/473 |
| 2008/0151834 A1 | 6/2008 | Natarajan |
| 2008/0320149 A1* | 12/2008 | Faccin ................ H04W 76/041 709/228 |
| 2009/0170469 A1* | 7/2009 | Tuli ...................... H04M 15/00 455/406 |
| 2009/0213760 A1 | 8/2009 | Shin et al. |
| 2010/0234071 A1 | 9/2010 | Shabtay et al. |
| 2013/0060459 A1* | 3/2013 | Thach ................. G01C 21/3423 701/400 |
| 2013/0077482 A1* | 3/2013 | Krishna ................ H04W 36/22 370/230 |
| 2013/0083783 A1* | 4/2013 | Gupta ............... H04W 28/0215 370/338 |
| 2013/0183971 A1* | 7/2013 | Tamaki ............. H04W 36/0061 455/436 |
| 2013/0203435 A1* | 8/2013 | Smith ................... H04W 16/14 455/454 |
| 2014/0050208 A1 | 2/2014 | Annaluru et al. |
| 2014/0206368 A1 | 7/2014 | Maltsev et al. |
| 2014/0293959 A1 | 10/2014 | Singh et al. |
| 2014/0308959 A1 | 10/2014 | De Benedittis et al. |
| 2015/0109999 A1 | 4/2015 | Godin |
| 2015/0365954 A1 | 12/2015 | Levine et al. |
| 2016/0227449 A1 | 8/2016 | Sivavakeesar et al. |
| 2016/0242226 A1 | 8/2016 | Fushiki et al. |
| 2017/0070923 A1 | 3/2017 | Li et al. |
| 2017/0156086 A1 | 6/2017 | Tomici et al. |

OTHER PUBLICATIONS

Mikio Iwamura, Hideaki Takahashi, and Satoshi Nagata, "Relay Technology in LTE-Advanced," NTT DOCOMO Technical Journal, vol. 12, No. 2, pp. 29-36.

"UE Relay for Public Safety," HTC, 3rd Generation Partnership Project, SA WG2 Meeting S2 #98, Jul. 15-19, 2013, retrieved from http://www.3gpp.org/ftp/tsg_sa/WG2_Arch/TSGS2_98_Valencia/Docs/.

* cited by examiner

SEAMLESS MOBILE HANDOVER

CROSS-REFERENCE TO RELATED APPLICATIONS

This application claims the benefit of priority under 35 U.S.C. § 119(e) of U.S. Provisional Patent Application No. 62/080,255, filed Nov. 14, 2014, and entitled "Enabling Soft Handovers," which is hereby incorporated by reference in its entirety for all purposes. In addition, U.S. patent application Ser. Nos. 14/183,176; 14/777,246; 14/453,365; and 14/454,670 are hereby incorporated by reference herein in their entirety for all purposes.

BACKGROUND

Recent developments in wireless networking technology have enabled the creation of wireless local area networks (WLANs) and eNodeB base stations that are small enough to be located on board a moving vehicle, such as a bus. Providing wireless access to users on a vehicle have consequently become a reality. However, wireless mobile networks still have many challenges. One new technology that is changing wireless mobile networks today is the use of LTE networks for backhaul. Providing a backhaul connection, that is, a connection to the outside Internet, via a wireless connection enables the entire base station to be untethered from wires and for the base station to be capable of roaming, just as mobile phones have been able to do, using the same technology.

However, it remains challenging to provide a seamless handover from a macro network to a mobile vehicle network, to provide robust backhaul at the mobile vehicle, and to maintain consistent throughput at the mobile vehicle.

SUMMARY

Systems and methods for performing handover in a mobile operator network are disclosed.

In one embodiment, a method is disclosed, comprising: establishing, at a cellular base station, a relay connection with a second base station for backhaul; receiving a handover request for a mobile device, the handover request including an IP address; receiving, at the cellular base station, a handover confirmation message from the mobile device following handover authorization for the mobile device; sending, from the cellular base station, a request to the mobile device to shut down a cellular radio connection with the cellular base station; and establishing, using the IP address and a non-cellular radio, a data connection with the mobile device on the same IP address, thereby performing a handover of the mobile device for providing continued IP connectivity for the mobile device at the cellular base station.

The cellular base station may be an eNodeB and may be a type 1a LTE relay, and the mobile device may be a user equipment (UE). The cellular base station requests radio bearers over a Un protocol connection from the second base station. The non-cellular radio may be a Wi-Fi™ radio and the cellular radio connection may be an LTE radio connection. The method may further comprise delivering data via Wi-Fi™ to the mobile device and spoofing a core network regarding the delivered data via releasing a data radio bearer while keeping an S1 connection. The method may further comprise reestablishing an LTE radio connection prior to handover to another LTE cell. The method may further comprise using a dynamic host configuration protocol (DHCP) server and Wi-Fi™ controller to assign the IP address over the non-cellular radio. The method may further comprise tracking, prior to receiving the handover request for the mobile device, radio resource usage of the mobile device, and transferring the tracked radio resource usage to the cellular base station during handover.

In another embodiment, a system is disclosed, comprising: a multi-radio access technology (multi-RAT) base station configured to perform steps, including: establishing, at a cellular base station, a relay connection with a second base station for backhaul; receiving a handover request for a mobile device, the handover request including an IP address; receiving, at the cellular base station, a handover confirmation message from the mobile device following handover authorization for the mobile device; sending, from the cellular base station, a request to the mobile device to shut down a cellular radio connection with the cellular base station; and establishing, using the IP address and a non-cellular radio, a data connection with the mobile device on the same IP address, thereby performing a handover of the mobile device for providing continued IP connectivity for the mobile device at the cellular base station.

The system may further comprise a Wi-Fi™ controller. The multi-RAT base station may be a mobile base station. The multi-RAT base station may have a LTE radio and a Wi-Fi™ access radio.

DETAILED DESCRIPTION

Given that it is desirable to have user devices connect to Wi-Fi™ once they are on board a vehicle like a bus, it is also desirable for a network to permit end user data sessions to seamlessly hand over, without dropped packets or broken connections, from the macro network to the vehicle Wi-Fi™ network. The same service requirement is desirable for hand-out as well as hand-in, for when the user exits the bus.

As well, it is important to enable a user to experience a consistent data session experience, and in order to facilitate such an experience, it is important for the vehicle network to have a robust backhaul connection. As a corollary, if the vehicle network is using LTE to provide the backhaul connection, it is important to avoid interfering with the physical radio resources being used to provide that backhaul connection.

As well, it is important to be able to provide load control on the vehicle access network. Since users on the vehicle access network may be unaware that they are sharing a limited pool of bandwidth, they may perform intensive data streaming that may saturate the backhaul connection of the vehicle network and lead to congestion for many users. It is undesirable to keep such users on the vehicle network, and instead such users should be shifted back to the macro network.

Therefore, since such handover situations will occur frequently, it is desirable to establish a robust mechanism for hand-in and hand-out interactions with the macro network.

In the present disclosure, three embodiments are described, with a fourth embodiment being used to describe an improved tracking area allocation strategy for mobile base stations of the type described herein. Firstly, a central-anchoring based handover scheme is described. Secondly, a multipath TCP (MPTCP) handover scheme is described. Thirdly, a local-anchoring based handover scheme is described. Fourthly, a tracking area allocation strategy is described.

Various embodiments as described herein are described with relation to heterogeneous network deployments and controllers for heterogeneous networks. Specifically, the inventors have contemplated the benefit of a network controller placed between the radio access network (RAN) and the operator core network (otherwise known as the evolved packet core, or EPC). Such a network controller could provide coordination among access networks, coalescing and proxying to reduce signaling over the network access stratum (NAS) signaling plane, and simplified management to the core. A more specific discussion of the network controller may be found below with reference to FIG. 8, as well as in U.S. patent application Ser. Nos. 13/889,631; 14/024,717; 14/034,915; 14/642,544; 14/806,594; and other co-owned applications, each of the above applications being hereby incorporated by reference in their entirety for all purposes.

Figure 1:
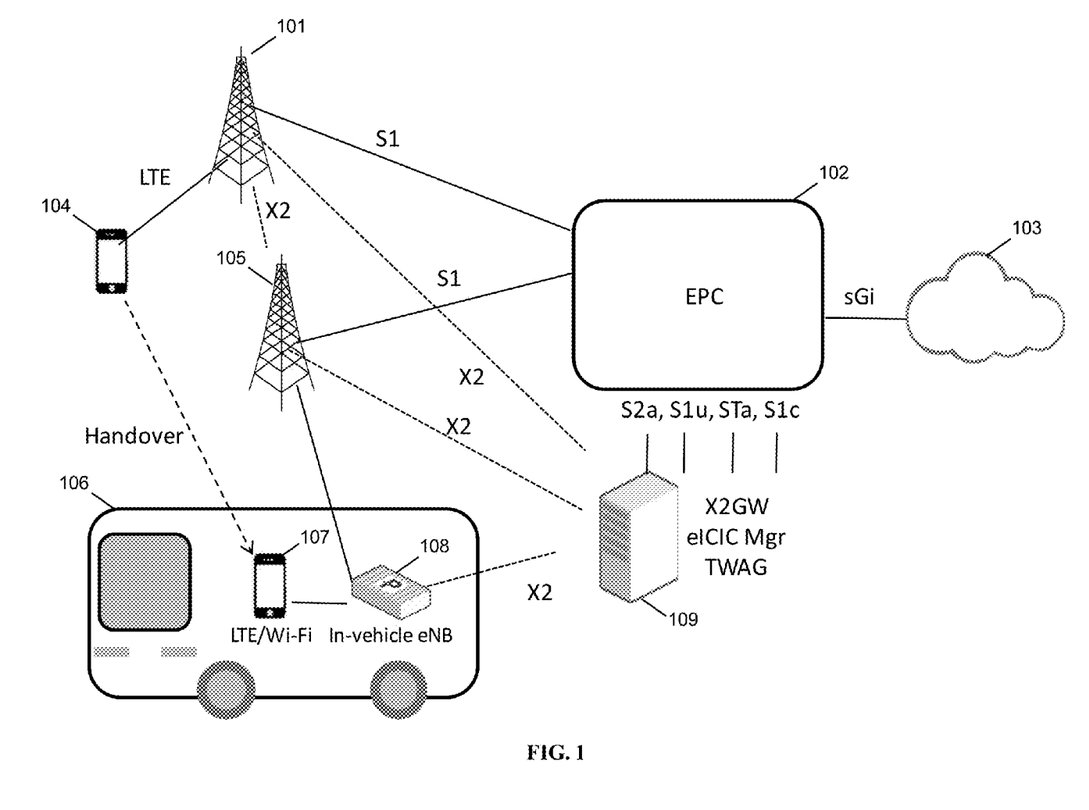
FIG. 1 is a network architecture diagram in accordance with a first embodiment.

FIG. 1 is a network architecture diagram in accordance with a first embodiment. An operator network includes macro towers 101, 105, and evolved packet core (EPC) 102, and X2 gateway 109. Bus 106 includes in-vehicle multi-radio access technology (multi-RAT) base station 108. A user connection is provided via the EPC 102 to the public Internet and other networks 103. EPC 102 is understood to include necessary servers and functionality, e.g., a mobility management entity (MME), a packet gateway (PGW), a serving gateway (SGW), an authentication, authorization and accounting server (AAA), a home subscriber server (HSS), and/or other servers and services as needed.

Macro cells 101 and 105 communicate via the S1 protocol to EPC 102. Additionally, macro cells 101 and 105 communicate via X2 with each other and with X2 gateway 109. Mobile base station 108 communicates with X2 gateway 109 via X2, and has an LTE connection to macro cell 105, which it uses for backhaul.

Gateway 109 may, in some embodiments, provide X2 proxying and forwarding between the radio access network (RAN) nodes and the core network. Gateway 109 may also, in some embodiments, provide enhanced inter-cell interference coordination (eICIC) services and trusted wireless access gateway (TWAG) services to EPC 102. X2 gateway 109 may use the S1/S1u/S1c protocol to pass along and in some cases modify control plane signaling between the RAN and EPC 102. X2 gateway 109, in its capacity as TWAG, may use the S2a protocol to pass along and in some cases modify control plane signaling between trusted wireless devices (not shown) and EPC 102. X2 gateway may also, in its capacity as TWAG, use the S2a protocol to communicate between a trusted non-3GPP IP access network and the 3GPP AAA Server/Proxy that is part of EPC 102. X2 gateway 109 may, in some embodiments, provide configuration, optimization with dynamic self-organizing network functions, S1 Gateway functions, security gateway, real-time ICIC and coordinated multi-point (CoMP) functionality.

In some embodiments, the mobile base station may be a multi-radio access technology (multi-RAT) base station, including at least Wi-Fi™ and LTE. In some embodiments, the mobile base stations may also provide mesh access and/or mesh backhaul. Further information regarding a base station that may be used according to various embodiments is found at FIG. 7.

In this first embodiment, the following assumptions may apply.

UEs 104, 107 may be multi-RAT UEs, e.g., supporting Wi-Fi™ and LTE. The base station 108 may be assumed to provide Wi-Fi™ access using a trusted Wi-Fi™ access paradigm. Mobile wireless networks may permit trusted and/or untrusted non-3GPP (e.g., typically Wi-Fi™) access, using a wireless access gateway (WAG) or a trusted wireless access gateway (TWAG). The Wi-Fi™ access network may support 802.1x authentication, RAN encryption, EAP authentication, and IPv4 and/or IPv6. A GTP/MIP/PMIP tunnel is used to encrypt traffic from a Wi-Fi™ access point to the core network. As GTP requires a user subscriber profile, a TWAG typically requires a user's device to have a SIM card to provide network access.

Additionally, the operator's network and EPC 102 may be assumed to support the S2a interface, for interfacing with the TWAG.

Additionally, the UE may be assumed to support a logical interface for multi-mode IP, as defined in "Logical Interface Support for Multi-Mode IP Hosts," IETF (Internet Engineering Task Force) Netext Logical Interface Support 10 Internet-Draft, hereby incorporated by reference in its entirety for all purposes. The logical interface at the UE is a construct that enables multiple link-layer physical interfaces to be hidden from the IP network stack and used as a single interface. Using multiple interfaces as a single interface allows, e.g., multiple attachment by the mobile node with multiple interfaces at once, or handoff between interfaces, or other features. This feature is supported by mobile device operating systems such as Google™ Android™ and is expected to be supported by Apple™ iOS™.

Additionally, the UE may be assumed to support the Hotspot 2.0/IEEE 802.11u-2011 specification, which provides, among other features, a common authentication abstraction for different types of wireless networks. Both Apple™ iOS™ and Google™ Android™ are known to support this feature.

In operation, the UE 104 is anchored at gateway node 109, which provides mobility anchoring in addition to, as shown, X2 gateway, eICIC, and TWAG functionality. The anchoring at gateway 109 allows mobility between macro networks 101, 105 and the Wi-Fi™ network at access point 108 in bus 106.

At a first time, user equipment 104 is attached to the network via LTE at macro cell 101. At a second time, the same UE boards bus 106 and the following steps occur.

If the Wi-Fi™ network at access point (AP) 108 is not congested, UE 107 may handover from LTE to Wi-Fi™, and the Wi-Fi™ traffic may be re-anchored to the PGW that is part of EPC 102. This re-anchoring may be performed by gateway 109 using the S2a protocol. Signaling messages for the handover go through gateway 109, and gateway 109 performs translation and interworking of credentials, active user sessions, etc. from the LTE domain to the trusted Wi-Fi™ domain.

If the Wi-Fi™ network at AP 108 is congested, UE 107 may still handover from macro cell 101 to base station 108. However, UE 107 may handover to the LTE eNodeB at base station 108. In this scenario, the total potential number of LTE-LTE handovers is reduced significantly relative to an ordinary LTE mobile base station, and this reduction will result in improved signaling performance throughout the LTE network for all users.

In both handover scenarios, the IP address is able to remain the same for the UE because of the logical interface construct. Since applications on the UE are presumably using the logical interface, and since the IP address is anchored either at EPC 102 or re-anchored via gateway 109/PGW (not shown), app network traffic will continue to use the original IP address of UE 104. This constitutes a seamless handover.

When the UE leaves the bus, the following steps will take place. If the UE was served via Wi-Fi™ access on the bus, the UE will be handed back over from AP 108 to macro 105, via a Wi-Fi™ to LTE. If the UE was served via LTE access on the bus, the UE will be handed over from eNodeB 108 to macro 105 via an LTE-LTE handover. Again, this handover is transparent to the UE, keeps the same IP address, and is a seamless handover.

Considering interference, if the LTE frequencies used on the bus and at the macro are different LTE bands, in-vehicle eNodeB 108 will cause minimal interference. If the LTE nodes are provisioned to use the same band (i.e., the co-channel deployment scenario), various schemes may be used to mitigate potential interference, such as eICIC or dynamic carrier aggregation, etc.

Discussion of the second embodiment follows.

Figure 2:
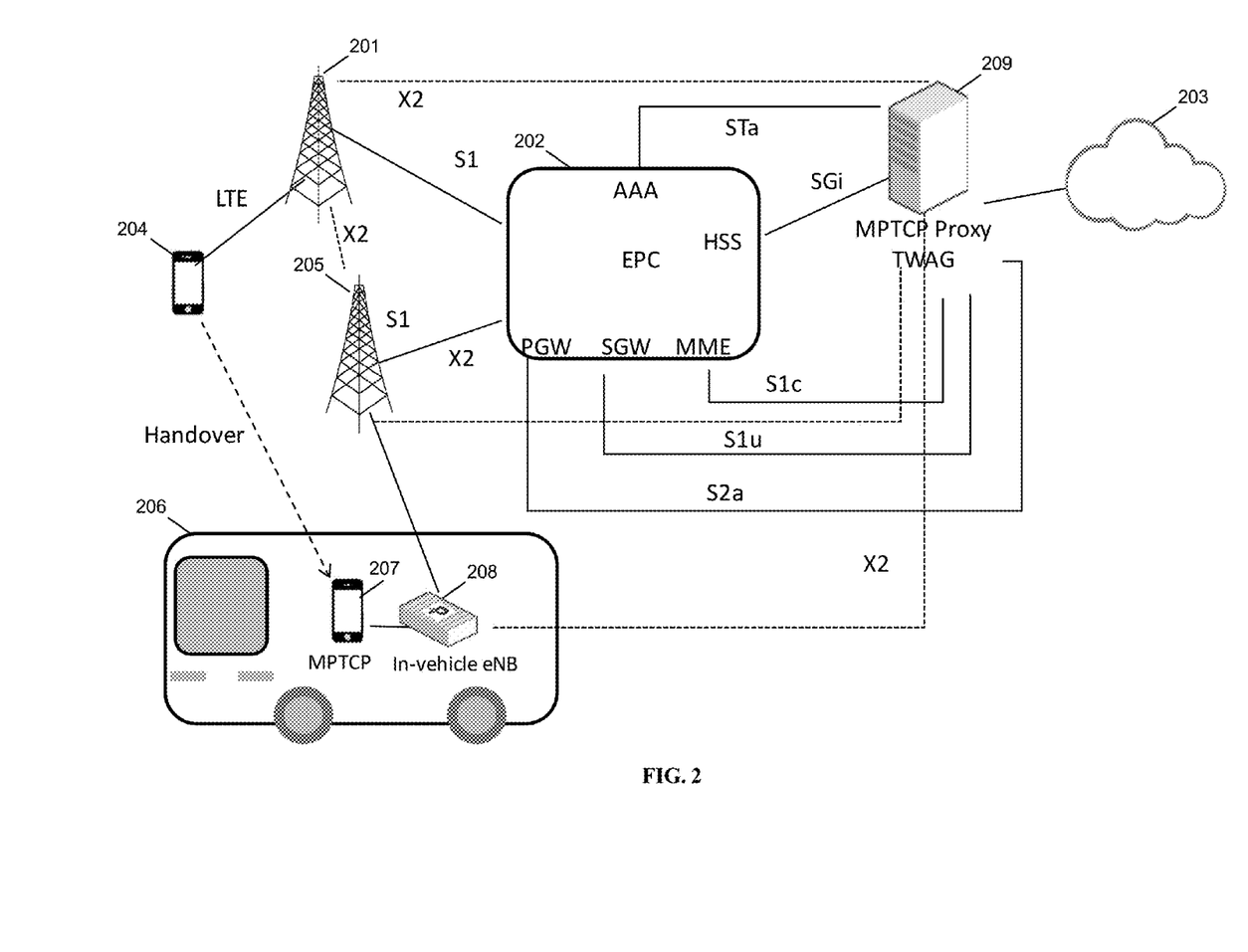
FIG. 2 is a network architecture diagram in accordance with a second embodiment.

In this second embodiment, the following assumptions may apply. Various features described above may be required, including: trusted Wi-Fi™ access throughout the network, and S2a interface support at the PGW in EPC 202; and UE support for Hotspot 2.0. Additionally, UE applications may be assumed to support multipath TCP (MPTCP). Apple™ iOS™ 7.0 and Android™ Lollipop™ and above support this feature, which works as follows.

In multipath TCP, instead of a single transport connection being limited to a single path, a single TCP flow is broken up into multiple TCP sub-flows, which can take different paths to reach their target endpoints and are joined together as a single MPTCP flow at the destination. The specifics of the IP flow are abstracted away, similar to how the physical interface of the IP flow is abstracted away by the IETF logical interface described with respect to the first embodiment. Most applications can support MPTCP without any changes at all, if they are written to use an operating system's IP socket interface, and the operating system is written to support multipath TCP. Further information about multipath TCP may be found at IETF RFC 6182, which is hereby incorporated by reference in its entirety for all purposes.

FIG. 2 is a network architecture diagram in accordance with the second embodiment. Macro cells 201 and 205 are part of an operator core network, together with EPC 202. Gateway 209 is situated in the operator network between the EPC and any other packet networks, indicated by cloud 203. Mobile base station 208 provides a combination of Wi-Fi™ and LTE access to mobile devices on bus 206. Prior to handover, the UE 204 is initially covered by macro cell 201, including multipath TCP, and the MPTCP connection is proxied by gateway 209. Gateway 209 is a MPTCP proxy and a TWAG.

In operation, UE 204 gets on bus 206, leading to the following steps. If Wi-Fi™ capacity is sufficient on the bus, base station 208 may, using MPTCP, provide both a Wi-Fi™ and an LTE connection to UE 207 after handover. This increases the available bandwidth for the UE. UDP traffic may be carried via the Wi-Fi™ connection and re-anchored to the PGW (part of EPC 202) via the S2 interface. Since the IP address is kept the same, handover will be transparent to the UE.

If Wi-Fi™ capacity is constrained or congested, the base station 208 may determine that an LTE connection only is more suitable than a combined Wi-Fi™ and LTE connection. LTE local serving traffic from within the bus may be relayed from base station 208 to macro 205. MPTCP traffic may be proxied by gateway 209.

Either a full-mode or single-path mode MPTCP request may be triggered to deliver the content at the highest possible speed to the UE, based on content requests made by the UE, or on a traffic management module at gateway 209, or both. Local caching of popular content at gateway 209 or local base station 208 may also boost speed, in some embodiments. As well, automatically-adjusted ACK pacing may be employed to provide real-time congestion control for one or more networks between UE 207 and gateway 209, wherein the pace of ACKs may be slowed as congestion increases. ACK pacing may also be managed by a traffic management module at gateway 209.

When the UE leaves the bus, the MPTCP connection is re-established over the LTE connection with a macro, such as macro 205, and continues to be proxied by gateway 209. As a result of the operation of MPTCP, packets continue to arrive at the UE and the Wi-Fi™ to LTE handover from the bus to macro 205 is transparent to the user, making this handover seamless as well.

In this second embodiment, interference may be mitigated in the same way as in the first embodiment, namely, via the use of two different LTE bands for the bus and the macro LTE, and the use of eICIC or dynamic CA if the bus and macro are sharing the same LTE band.

It is noted that this second embodiment does not require a logical interface construct on the UE like that described with regard to the first embodiment. As well, it capable of abstracting away any IP address changes, and permits higher throughput in some situations, as multiple TCP connections can coexist. UDP handover is also handled well via S2a handover. However, UE applications do require support for MPTCP, in some cases, and an MPTCP proxy is needed in the location shown in FIG. 2.

Figure 3:
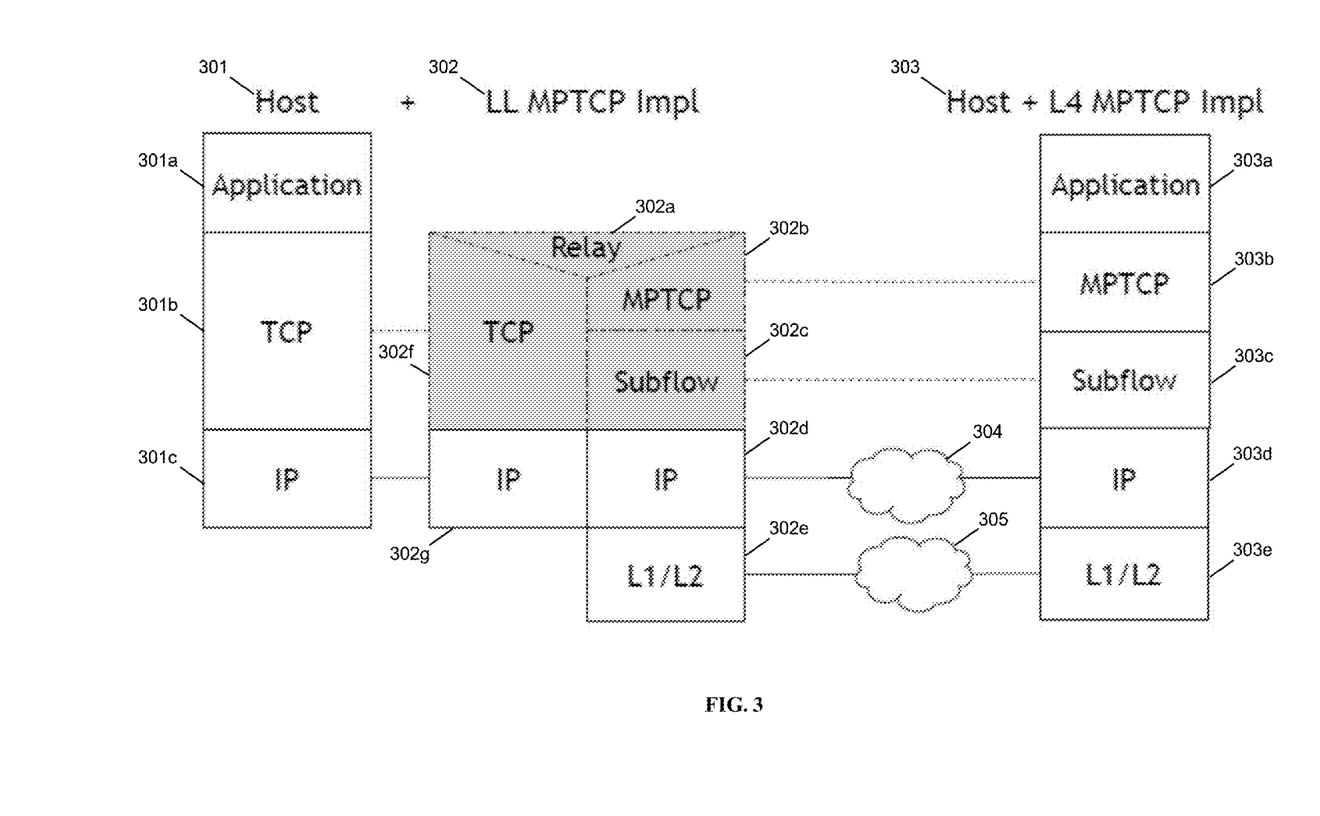
FIG. 3 is a network stack diagram in accordance with the second embodiment.

FIG. 3 is a network stack diagram in accordance with the second embodiment. As described above with reference to FIG. 2 and the second embodiment, multipath TCP is used to provide improved performance and consistent network utilization. Host network stack 301 is shown, being made up of application 301*a*, TCP flow 301*b*, and IP layer 301*c*. Host 301 is an arbitrary network host on the public Internet or a private network. Host 301 is understood to not be limited to any particular lower-level link type.

Link layer MPTCP-implementing network stack 302 is also shown, including relay 302*a*, which intermediates between TCP layer 302*f* and the combination of MPTCP layer 302*b* and subflow layer 302*c*. In operation, packets are received from host 301*c* by IP layer 302*g*, and passed to MPTCP-enabled IP layer 302*d* and from there to cloud 304. Layer 1/Layer 2 layer 302*e* is also present and is enabled to communicate via cloud 305. In some embodiments, stack 302 is located at gateway 209, which acts as the MPTCP proxy as well as the TWAG. Gateway 209 enables, in other words, packet flows from cloud 203 to become multipath-enabled as they pass into the operator core network 202.

Host+L4 MPTCP stack 303 is also shown. Application 303a does not necessarily need to be aware of the operation of multipath TCP, as this can be handled at the operating system layer. Multipath TCP layer 303b coalesces underlying TCP subflows 303c, which are received over IP layer 303d from cloud 304, and over L1/L2 303e layer from cloud 305.

Discussion of the third embodiment follows.

In some cases, it may be advantageous to achieve seamless LTE-Wi-Fi™ handover without requiring TWAG core elements, or similarly, evolved packet data gateway (ePDG) core elements. Although TWAG and ePDG core elements are widely available in the market, they nevertheless require a significant degree of customization and support, which is a barrier to adoption of any approaches that use these technologies.

Additionally, it may be advantageous to reduce use of LTE spectrum, thereby reducing interference as well as increasing the LTE frequency spectrum available for use by other devices and users.

As well, it may be advantageous to reduce the latency required by other approaches. The use of a MPTCP proxy 209 and TWAG 109 arguably increase the amount of latency required for the connection, which could be improved upon.

As well, greater transparency to existing macro cells, EPC core nodes, and UEs, including UEs with varying levels of support for the technologies described above, may also be advantageous.

The following third embodiment achieves these advantages by taking advantage of a new technology, LTE Relay, disclosed further in, e.g., 3GPP Rel. 9 and Rel. 10, TS 36.806, 36.826, 36.836, 36.216, each hereby incorporated by reference in its entirety. LTE Relay aims to improve LTE performance at the cell edge by taking radio resources from so-called "donor" nodes and allowing "relay" nodes to share those resources with additional devices.

Ordinarily, LTE relay nodes operate as follows. A relay node Rn requests, to a macro cell over a Un interface, which is a modification of the E-UTRAN Uu air interface, that it receive sufficient radio resources for its own use. The macro cell is the donor node. Once the donor node grants the relay node the radio resources, the relay node uses the granted resources to provide access. In some cases, the resources are also used for backhauling the relay node. The donor node keeps track of which radio resources have been allotted to the relay node and avoids using those resources, allowing the relay node to send and receive data to and from UEs using those resources.

The present embodiment contemplates the use of a Layer 3 non-transparent type 1a relay node. Type 1 indicates that a relay eNodeB connects to a donor eNodeB using the Un interface to reserve radio resources, which it then distributes among its attached UEs. Since the relay node is non-transparent, it is managed as an eNodeB, and acts as a full eNodeB to any UEs. The donor eNodeB (DeNB) hosts S1/X2 proxy functionality for any supported relay nodes, as well as S11 termination and S-GW/P-GW functionality for its relay nodes.

According to some embodiments, the relay node is contemplated to use modified 3GPP semantics to provide access via Wi-Fi™ even as it uses LTE for backhaul, while preserving the UE's IP address and thereby offering seamless handover. The contemplated modified relay node also avoids the disadvantages of Type 1b inband relaying, which forces the Un and Uu connections to share the same band and is susceptible to self-interference.

Figure 4:
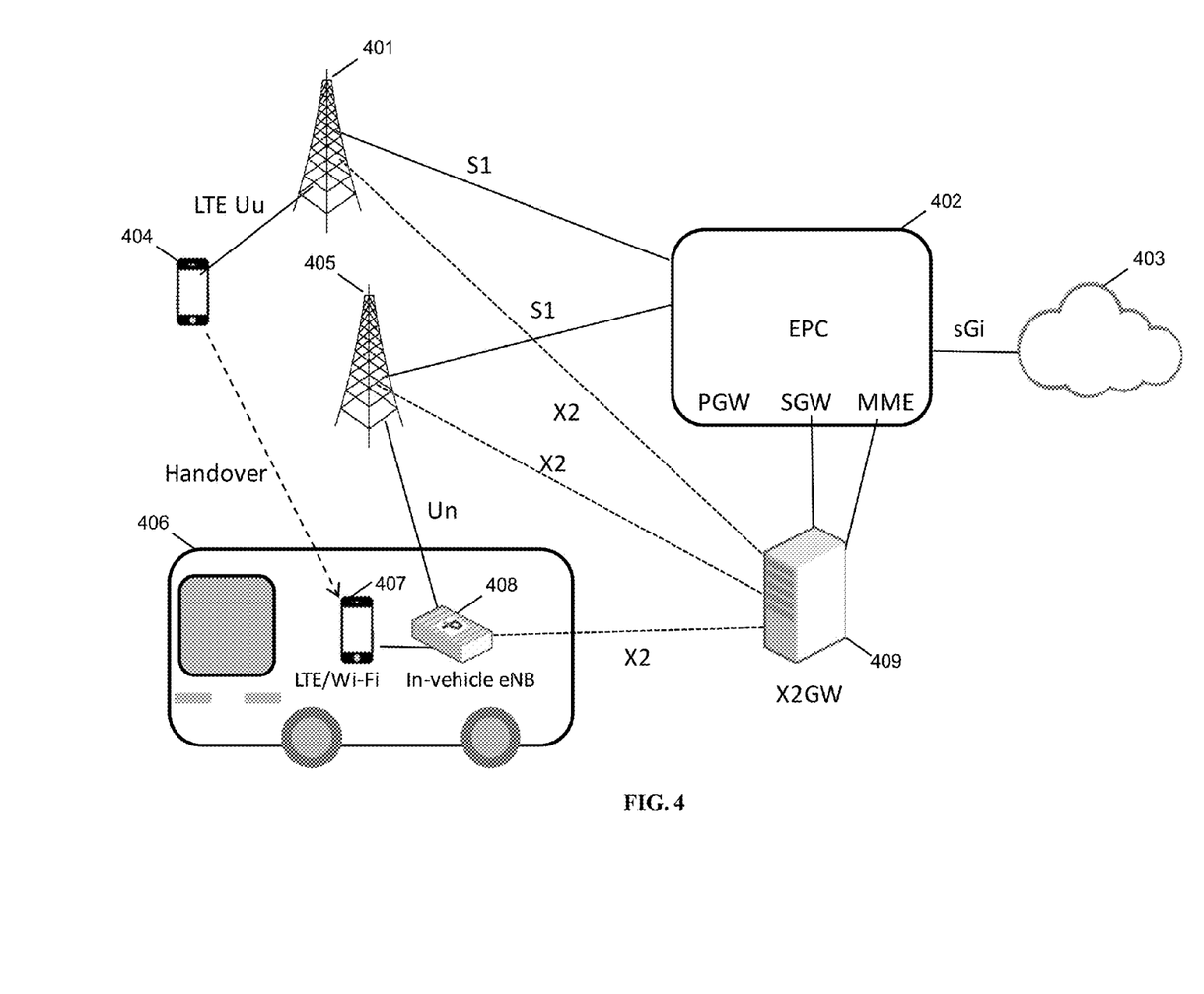
FIG. 4 is a network architecture diagram in accordance with a third embodiment.

FIG. 4 is a network architecture diagram in accordance with a third embodiment. Macro cells 401 and 405 provide access to LTE UE 404 over the Uu interface and communicate with EPC 402 via the S1 interface. EPC 402 and packet data network 403 provide access to various required and optional services. Gateway 409 provides X2 communications among each of macro 401, macro 405, and eNodeB 408, and provides X2 proxy capability to and from EPC 402. Bus 406 contains base station 408, which is an in-vehicle LTE eNodeB and Wi-Fi™ access point (e.g., a multi-RAT node). Base station 408 is also a relay node, and communicates via the Un interface for backhaul and signaling to macro 405. Since base station 408 is using the same LTE band, donor node/macro 405 coordinates scheduling so that it does not use the signaling slots requested by relay node 408. The operation of UEs 404, 407 is as described below. The use of X2 gateway 409 permits the use of an X2 handover from macro 401, 405 to in-vehicle eNodeB 408.

Figure 5:
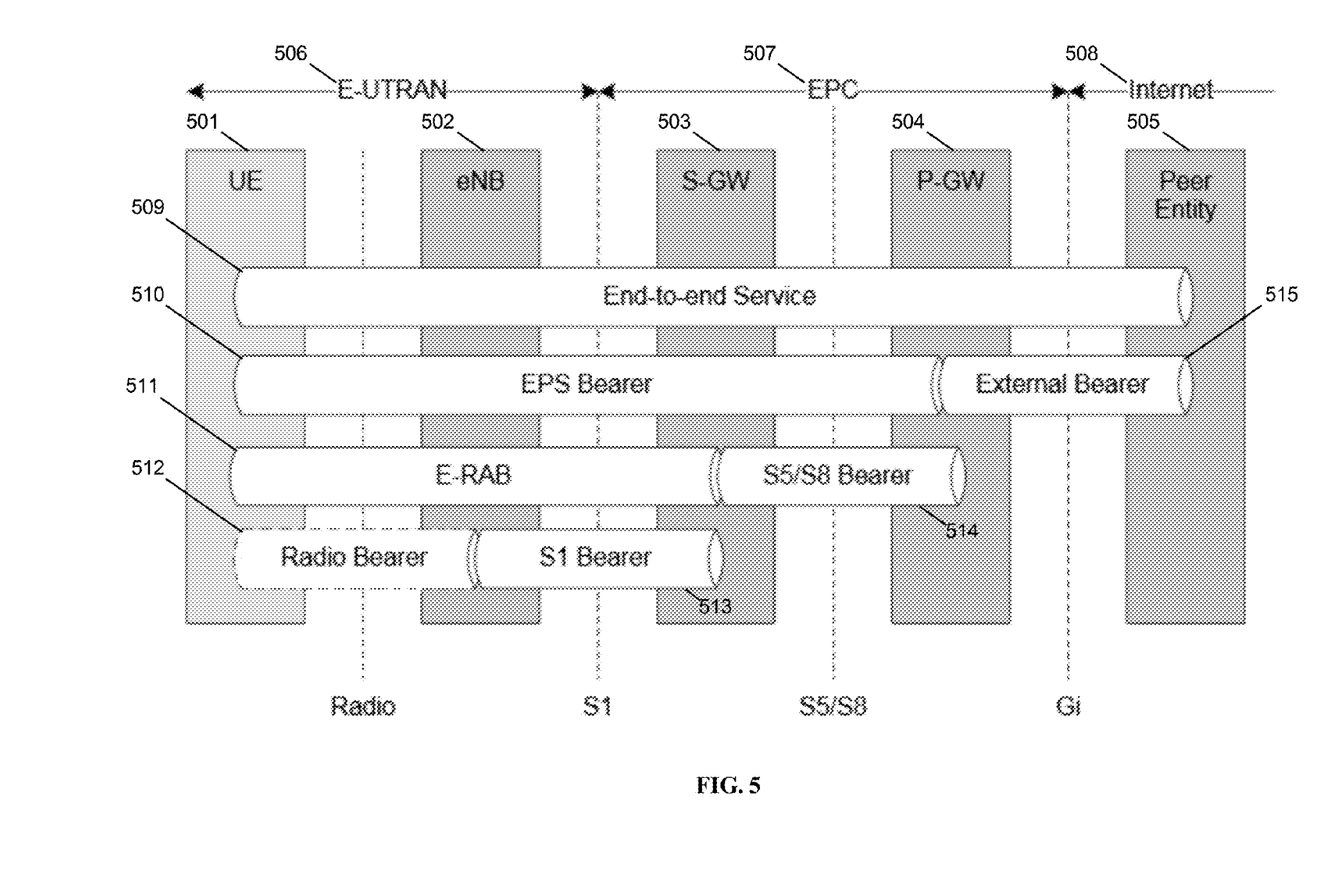
FIG. 5 is a network signaling diagram in accordance with the third embodiment.

FIG. 5 is a network signaling diagram in accordance with the third embodiment. UE 501 communicates with eNodeB 502, which together comprise evolved universal terrestrial radio access network (E-UTRAN) 506. eNodeB 502 communicates with evolved packet core 507, which comprises serving gateway (S-GW) 304 and packet gateway (P-GW) 504; to simplify the operation of the network, eNodeB 502 is subject to signaling from S-GW 503, and sends and receives packets to and from P-GW 504. P-GW 504 acts as a gateway to the Internet 505/508.

Each layer of the stack relies on the next-lower layer for transport. End-to-end service 509 is made possible by an evolved packet system (EPS) bearer 510 with an external bearer 515. EPS bearer 510 sits atop an evolved radio access bearer (E-RAB) 511 and an S5/S8 bearer 514. E-RAB 511 sits atop a radio bearer 512 and an S1 bearer 513.

Radio bearer 512 is the L1/L2/L3 radio connection between UE 501 and eNodeB 502. In the present embodiment, it is noted that this bearer is switched out. Whereas typically an E-UTRAN radio bearer would be used in the EUTRAN 506, a special eNodeB 502 may allow another radio bearer to be used, such as a Wi-Fi™ connection, instead of the EPS radio bearer.

Figure 6:
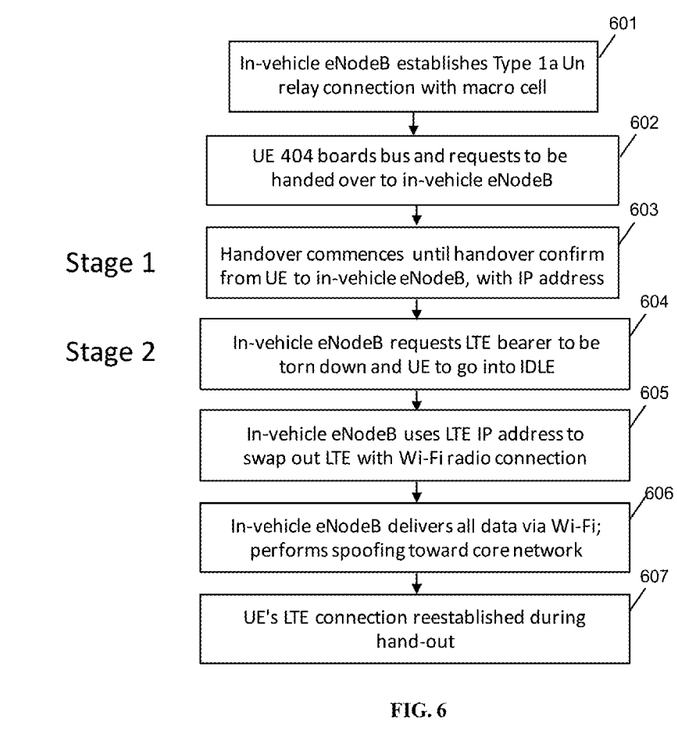
FIG. 6 is a flowchart in accordance with the third embodiment.

FIG. 6 is a flowchart in accordance with the third embodiment.

At step 601, in operation, in-vehicle eNodeB 408 establishes a type 1a Un connection with donor macro node 405. While the bus is moving, handover of the in-vehicle eNodeB 408 itself, for example, from macro node 405 to macro node 401, is implemented according to the Un handover specification in 3GPP 36.836. Relay nodes are able to request a certain number of radio resources (physical radio bearers) from donor nodes via the Un interface. eNodeB 408 may accordingly request a number of radio resources reflecting its backhaul bandwidth needs, plus some overhead for signaling. However, according to this embodiment, eNodeB 408 does not need to request a significant number of downlink radio bearers for access use by UEs attached to it within the bus.

Next, at step 602, UE 404 boards bus 406 and requests to be handed over to eNodeB 408. Following Un negotiations, a standard set of physical downlink control channel (PDCCH) resources and physical uplink control channel (PUCCH) resources may be requested and assigned to eNodeB 408. These PDCCH/PUCCH resources are used for signaling only. Little or no physical resource bearers (PRBs) are requested by the eNodeB 408 for user data, in some embodiments, including physical downlink shared channel (PDSCH)/physical uplink shared channel (PUSCH) PRBs. The number of PRBs requested may be configurable up or down and may be based on the number of UEs expected to be connected to eNodeB 408.

At step 603, handover commences, including the X2AP handover request from macro 401 to eNodeB 408; the acknowledgement message from eNodeB 408 to macro 401; the handover command from macro 401 to UE 404; the X2AP SN transfer status message from macro 401 to eNodeB 408; and the handover confirm from UE 404 to eNodeB 408. Step 603 of the handover is called "stage 1." It includes transfer of UE 404's prior IP address from macro 401, as well as information reflecting any data sessions active at the time of the handover, such as throughput being used prior to handover or a number of resource blocks being used prior to handover. The IP address is sufficient to deliver any data traffic in process from before the handover, as well as to set up a GTP tunnel from eNodeB 408 to the core network for this data traffic.

The next stage, "stage 2," differs from the standard LTE handover process. Instead of setting up a new radio bearer between the UE and the eNodeB for transferring data, at step 604, eNodeB 408 immediately requests that the UE tear down the LTE radio bearer and go to IDLE/long DRX mode, e.g., RRC release messages to UE are sent. However, importantly, eNodeB 408 does not send a UE Context Release message to the EPC 402, leaving S1u and S1c intact, as well as S1 bearer, E-RAB and S5/S8 bearers, etc. This ensures that EPC 402 still believes the UE is connected.

Any Wi-Fi™ connection requests prior to the end of Stage 1 have been queued, and have not been satisfied. Now, at step 605, eNodeB 408 then effectively instantaneously swaps the LTE data radio bearer for a Wi-Fi™ radio connection. Any Wi-Fi™ association requests may be satisfied by eNodeB 408. Wi-Fi™ 802.11 EAP authentication, or other authentication, may be performed, with or without the participation of other nodes such as gateway 409 and EPC 402. eNodeB 408 is understood to include a Wi-Fi™ controller and dynamic host configuration protocol (DHCP) module, and this module is used to return to UE 404 the IP address it formerly had when it was attached to macro 401. This completes the handover, and seamless IP connectivity has been restored. Step 605 relies on the IP address received at step 603.

In some embodiments, according to this method, it is possible to provide the same downstream bandwidth to UE 404 via Wi-Fi™ instead of LTE, as information about prior data use was transferred along with the X2 handover state. Any user data transferred will be forced to transfer over the Wi-Fi™ connection. This frees up LTE radio resources and permits more bandwidth to be used for, e.g., backhaul for the mobile base station node 408 itself. A Wi-Fi™ controller at base station 408 may choose to, for example, allocate Wi-Fi™ slots proportionally to the amount of data being used by each UE on the bus, or to allocate Wi-Fi™ slots to ensure no degradation of service from prior to handover, among other examples.

At step 606, after handover is complete, UE 404 is in IDLE mode, but eNodeB 408 continues to respond to messages from EPC 402 on behalf of UE 404. However, in most cases these messages must be spoofed, because UE 404 is no longer in ACTIVE mode on an LTE bearer. Paging may be performed by either waking the UE 404 from IDLE or by performing paging over Wi-Fi™. Even if the UE is caused to enter an active mode via LTE paging, any data payload may be delivered over Wi-Fi™. eNodeB 408 may send messages to EPC 402 reflecting continued Uu utilization of user data based on its consumption of Wi-Fi™ data.

At step 607, when UE 404 hands out from the bus and its LTE connection is reestablished, using the stored connection information, eNodeB 408 ensures that it continues to receive the appropriate level of service from EPC 402. Because the eNodeB 408 maintains the S1 connection and ECM, EMM connections, etc., handover latency is minimized.

Advantages of this method include the following. Since only a small chunk of the PDSCH and PUSCH are needed by UE 404 or eNodeB 408 in order to carry SRBs and the PUCCH, a greater amount of spectrum is made available for use by macro 405 or by other UEs on bus 406. This handover method is faster and has less latency than the typical handover scheme, as it stays in the same core node, does not require an ePDG or TWAG, and requires only the same GTP reestablishment required by any LTE-LTE handover. This method may utilize a virtual interface construct as described above with respect to the first embodiment, in some embodiments.

In some embodiments, additional relays may be added for greater coverage. This method may be adapted for use with hotspots as well.

As an example, for a 20 MHz-wide LTE band, a bus base station may request 100 PRBs from the donor node. This allotment may be split between user data PRBs (90+ PRBs) and signaling-only PRBs (4-6 PRBs total, to be used for all UEs). No in-vehicle LTE data radio bearers (DRBs) are needed to be obtained, in this embodiment. The typical utilization of signaling radio bearers (SRBs) using this technique are estimated to be 1-2 PRBs for SRB1 and SRB2 signaling, as well as 3-4 uplink PRBs for the PUCCH.

Figure 7:
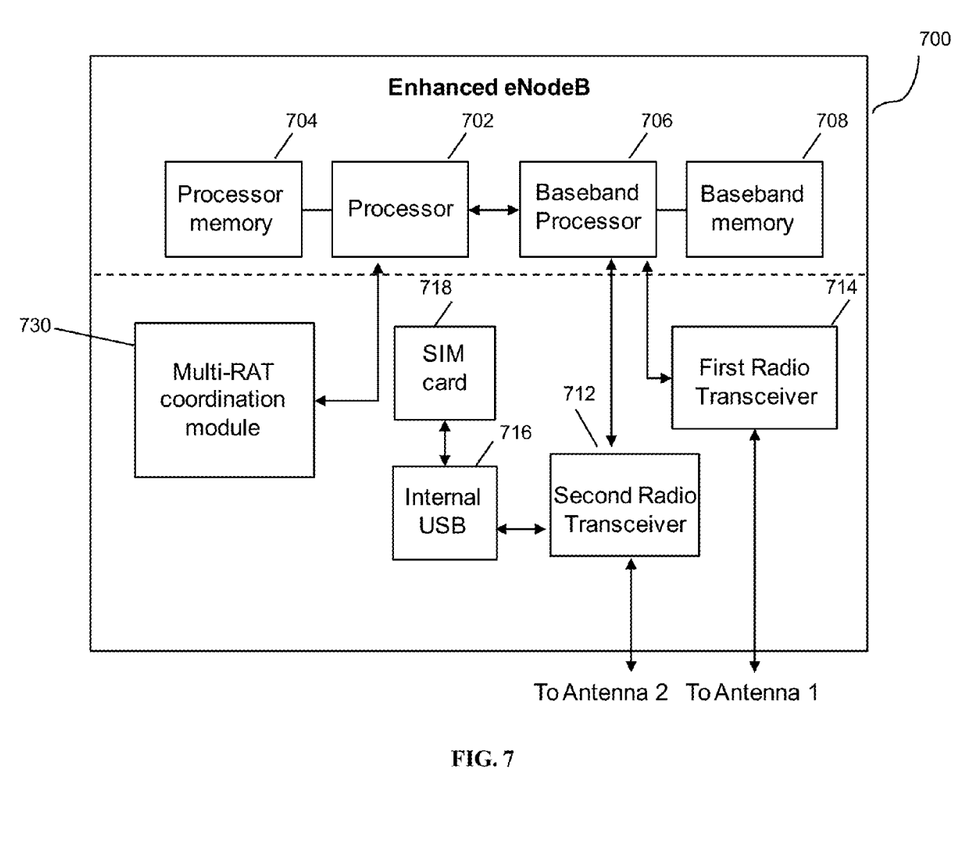
FIG. 7 is a block diagram of an enhanced eNodeB, in accordance with some embodiments.

FIG. 7 is a block diagram of an enhanced eNodeB, in accordance with some embodiments. Enhanced eNodeB 700 may include processor 702, processor memory 704 in communication with the processor, baseband processor 706, and baseband processor memory 708 in communication with the baseband processor. Enhanced eNodeB 700 may also include first radio transceiver 710 and second radio transceiver 712, internal universal serial bus (USB) port 716, and subscriber information module card (SIM card) 718 coupled to USB port 714. In some embodiments, the second radio transceiver 712 itself may be coupled to USB port 716, and communications from the baseband processor may be passed through USB port 716.

A multi-RAT coordination module 730 may also be included, which may include a database (not shown), in some embodiments, or which may be in communication with a coordination server (not shown), in some embodiments, or both, in some embodiments. Module 730 may be a self-organizing network (SON) module, in some embodiments. Module 730 may track congestion on each of the Wi-Fi™ and LTE networks, in some embodiments, to help decide which radio should be used by each attached UE. Module 730 may track PRB usage before and after handover, and may translate usage of all connected UEs into communications with the core network, in some embodiments.

Processor 702 and baseband processor 706 are in communication with one another. Processor 702 may perform routing functions, and may determine if/when a switch in network configuration is needed. Baseband processor 706 may generate and receive radio signals for both radio transceivers 710 and 712, based on instructions from processor 702. In some embodiments, processors 702 and 706 may be on the same physical logic board. In other embodiments, they may be on separate logic boards.

The first radio transceiver 710 may be a radio transceiver capable of providing LTE eNodeB functionality, and may be capable of higher power and multi-channel OFDMA. The second radio transceiver 712 may be a radio transceiver capable of providing LTE UE functionality. Both transceivers 710 and 712 are capable of receiving and transmitting on one or more LTE bands. In some embodiments, either or both of transceivers 710 and 712 may be capable of providing both LTE eNodeB and LTE UE functionality. Transceiver 710 may be coupled to processor 702 via a Peripheral Component Interconnect-Express (PCI-E) bus, and/or via a daughtercard. As transceiver 712 is for providing LTE UE functionality, in effect emulating a user equipment, it may be connected via the same or different PCI-E bus, or by a USB bus, and may also be coupled to SIM card 718.

SIM card 718 may provide information required for authenticating the simulated UE to the evolved packet core (EPC). When no access to an operator EPC is available, a local EPC on the enhanced eNodeB itself (not shown) may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 700 is not an ordinary UE but instead is a special UE for providing backhaul to device 700.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 710 and 712, which may be Wi-Fi™ 802.11a/b/g/n/ac/ad/ah, Bluetooth™, ZigBee™, microwave (including line-of-sight microwave), or another wireless backhaul connection. Any of the wired and wireless connections may be used for either access or backhaul, according to identified network conditions and needs, and may be under the control of processor 702 for reconfiguration.

Other elements and/or modules may also be included, such as a home eNodeB, a local gateway (LGW), or another module. Additional radio amplifiers, radio transceivers and/or wired network connections may also be included.

Processor 702 may identify the appropriate network configuration, and may perform routing of packets from one network interface to another accordingly. Processor 702 may use memory 704, in particular to store a routing table to be used for routing packets. Baseband processor 706 may perform operations to generate the radio frequency signals for transmission or retransmission by both transceivers 710 and 712. Baseband processor 706 may also perform operations to decode signals received by transceivers 710 and 712. Baseband processor 706 may use memory 708 to perform these tasks.

Figure 8:
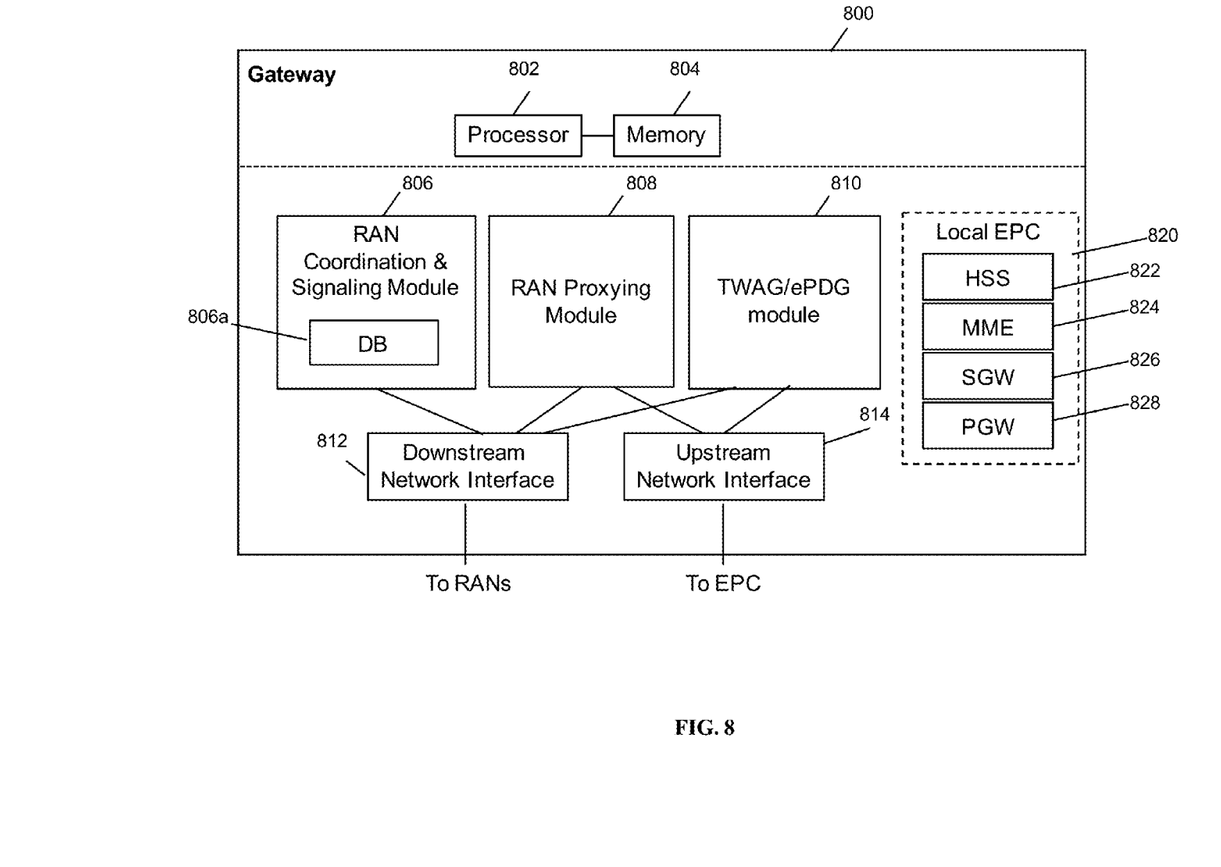
FIG. 8 is a block diagram of a coordinating node, in accordance with some embodiments.

FIG. 8 is a block diagram of a gateway node, in accordance with some embodiments. Gateway 800 includes processor 802 and memory 804, which are configured to provide the functions described herein. Also present are radio access network coordination/signaling (RAN Coordination and signaling) module 806, RAN proxying module 808, and trusted wireless gateway module 810.

RAN coordination module 806 may include database 806*a*, which may store associated UE signal quality parameters and location information as described herein. In some embodiments, gateway 800 may coordinate multiple RANs using coordination module 806. If multiple RANs are coordinated, database 806*a* may include information from UEs on each of the multiple RANs.

In some embodiments, gateway 800 may also provide proxying, routing virtualization and RAN virtualization, including X2, S1, and S2a proxying, via module 808. In some embodiments, a downstream network interface 812 is provided for interfacing with the RANs, which may be a radio interface (e.g., LTE), and an upstream network interface 814 is provided for interfacing with the core network, which may be either a radio interface (e.g., LTE) or a wired interface (e.g., Ethernet). Signaling storm reduction functions may be performed in module 806. In some embodiments, gateway 800 may also provide TWAG or ePDG services, using trusted wireless gateway module 810 and, in some instances, local EPC 820 and HSS 822.

Gateway 800 includes local evolved packet core (EPC) module 820, for authenticating users, storing and caching priority profile information, and performing other EPC-dependent functions when no backhaul link is available. Local EPC 820 may include local HSS 822, local MME 824, local SGW 826, and local PGW 828, as well as other modules. Local EPC 820 may incorporate these modules as software modules, processes, or containers. Local EPC 820 may alternatively incorporate these modules as a small number of monolithic software processes. Modules 806, 808, 810 and local EPC 820 may each run on processor 802 or on another processor, or may be located within another device.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi™ air interfaces, which may include one or more of IEEE 802.11a/b/g/n/ac. In some embodiments, the base stations described herein may support IEEE 802.16 (WiMAX™), to LTE transmissions in unlicensed frequency bands (e.g., LTE-U, Licensed Access or LA-LTE), to LTE transmissions using dynamic spectrum access (DSA), to radio transceivers for ZigBee™, Bluetooth™, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems. Wherever IMSI or IMEI are mentioned, other hardware, software, user or group identifiers, can be used in conjunction with the techniques described herein.

Those skilled in the art will recognize that multiple hardware and software configurations could be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention could be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment.

In the present disclosure, the words location and position may be used in various instances to have the same meaning, as is common in the relevant art.

Although the scenarios for interference mitigation are described in relation to macro cells and micro cells, or for a pair of small cells or pair of macro cells, the same techniques could be used for reducing interference between any two cells, in which a set of cells is required to perform the CoMP methods described herein. The applicability of the above techniques to one-sided deployments makes them particularly suitable for heterogeneous networks, including heterogeneous mesh networks, in which all network nodes are not identically provisioned.

In any of the scenarios described herein, where processing may be performed at the cell, the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi™, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, in various orders as necessary.

Although the above systems and methods for providing interference mitigation are described in reference to the Long Term Evolution (LTE) standard, one of skill in the art would understand that these systems and methods could be adapted for use with other wireless standards or versions thereof. For example, certain methods involving the use of a virtual cell ID are understood to require UEs supporting 3GPP Release 11, whereas other methods and aspects do not require 3GPP Release 11.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims. For example, use of a newer version of the LTE relay specification may be contemplated.

The invention claimed is:
1. A method, comprising:
establishing, at a Long Term Evolution (LTE) cellular base station providing LTE access, a relay connection with a second base station for backhaul;
receiving a handover request for a user equipment (UE) at the LTE cellular base station, the handover request including an IP address;
receiving, at the LTE cellular base station, a handover confirmation message from the UE following handover authorization for the UE;
sending, from the LTE cellular base station, a request to the UE to release an LTE radio bearer in use between the UE and the LTE cellular base station while maintaining an active session for the UE with an LTE core network;
establishing, using the IP address and a non-cellular radio of the LTE cellular base station, a data connection between the LTE cellular base station and the UE on the same IP address;
spoofing the LTE core network regarding maintaining the LTE radio bearer by responding, at the LTE cellular base station, to messages for the UE received via the active session;
receiving an LTE paging message at the LTE cellular base station from the LTE core network via the active session; and
delivering a data payload to the UE subsequent to the LTE paging message via the non-cellular radio,
thereby performing a handover of the UE for providing continued IP connectivity for the UE at the LTE cellular base station while preserving the UE's IP address on the non-cellular radio data connection.

2. The method of claim 1, wherein the LTE cellular base station is an eNodeB and is a type 1a LTE relay.

3. The method of claim 1, wherein the LTE cellular base station requests radio bearers over a Un protocol connection from the second base station.

4. The method of claim 1, wherein the non-cellular radio is a wireless local area network (WLAN) radio.

5. The method of claim 1, further comprising delivering data via a wireless local area network (WLAN) connection to the UE and spoofing the LTE core network regarding the delivered data via releasing the LTE radio bearer while keeping an S1 connection.

6. The method of claim 1, further comprising reestablishing an LTE radio connection prior to handover to another LTE cell.

7. The method of claim 1, further comprising using a dynamic host configuration protocol (DHCP) server and wireless local area network (WLAN) controller to assign the IP address over the non-cellular radio.

8. The method of claim 1, further comprising tracking, prior to receiving the handover request for the UE, radio resource usage of the UE, and transferring the tracked radio resource usage to the LTE cellular base station during handover.

9. A system, comprising:
a multi-radio access technology (multi-RAT) base station configured to perform:
establishing, at a Long Term Evolution (LTE) cellular base station providing LTE access, a relay connection with a second base station for backhaul;
receiving a handover request for a user equipment (UE) at the LTE cellular base station, the handover request including an IP address;
receiving, at the LTE cellular base station, a handover confirmation message from the UE following handover authorization for the UE;
sending, from the LTE cellular base station, a request to the UE to release an LTE radio bearer in use between the UE and the LTE cellular base station while maintaining an active session for the UE with an LTE core network;
establishing, using the IP address and a non-cellular radio of the LTE cellular base station, a data connection between the LTE cellular base station and the UE on the same IP address;
spoofing the LTE core network regarding maintaining the LTE radio bearer by responding, at the LTE cellular base station, to messages for the UE received via the active session;
receiving an LTE paging message at the LTE cellular base station from the LTE core network via the active session; and
delivering a data payload to the UE subsequent to the LTE paging message via the non-cellular radio,
thereby performing a handover of the UE for providing continued IP connectivity for the UE at the LTE cellular base station while preserving the UE's IP address on the non-cellular radio data connection.

10. The system of claim 9, further comprising a wireless local area network (WLAN) controller.

11. The system of claim 9, wherein the multi-RAT base station is a mobile base station.

12. The system of claim 9, wherein the multi-RAT base station has a LTE radio and a wireless local area network (WLAN) access radio.

13. The method of claim 1, further comprising sending the LTE paging message to the UE to cause the UE to enter an active mode on LTE.

14. The method of claim 1, further comprising sending the LTE core network messages reflecting utilization of user data based on the UE's consumption of data via the non-cellular radio.

15. The method of claim 1, further comprising delivering the data payload to the UE by establishing a GPRS tunneling protocol (GTP) tunnel.

* * * * *